US008619587B2

(12) United States Patent
Yong et al.

(10) Patent No.: US 8,619,587 B2
(45) Date of Patent: Dec. 31, 2013

(54) SYSTEM AND METHOD TO SUPPORT ENHANCED EQUAL COST MULTI-PATH AND LINK AGGREGATION GROUP

(75) Inventors: Lucy Yong, McKinney, TX (US); Yang Peilin, Nanjing (CN)

(73) Assignee: Futurewei Technologies, Inc., Plano, TX (US)

( * ) Notice: Subject to any disclaimer, the term of this patent is extended or adjusted under 35 U.S.C. 154(b) by 645 days.

(21) Appl. No.: 12/797,010

(22) Filed: Jun. 9, 2010

(65) Prior Publication Data

US 2011/0164503 A1 Jul. 7, 2011

Related U.S. Application Data

(60) Provisional application No. 61/292,448, filed on Jan. 5, 2010.

(51) Int. Cl.
*G01R 31/08* (2006.01)
(52) U.S. Cl.
USPC ........................................... 370/241; 370/392
(58) Field of Classification Search
None
See application file for complete search history.

(56) References Cited

U.S. PATENT DOCUMENTS

| 7,042,843 | B2* | 5/2006 | Ni .................................. 370/231 |
| 8,355,328 | B2* | 1/2013 | Matthews et al. ............. 370/235 |
| 2002/0161914 | A1* | 10/2002 | Belenki ........................ 709/235 |
| 2003/0152076 | A1* | 8/2003 | Lee et al. ....................... 370/389 |
| 2004/0038685 | A1* | 2/2004 | Nakabayashi ............. 455/452.2 |
| 2004/0039839 | A1* | 2/2004 | Kalyanaraman et al. ..... 709/238 |
| 2004/0184483 | A1* | 9/2004 | Okamura et al. ............. 370/477 |
| 2006/0039364 | A1* | 2/2006 | Wright .......................... 370/352 |
| 2007/0237150 | A1* | 10/2007 | Wood ............................. 370/392 |
| 2008/0025309 | A1 | 1/2008 | Swallow |
| 2009/0201811 | A1* | 8/2009 | Filsfils et al. ................. 370/235 |

FOREIGN PATENT DOCUMENTS

| CN | 101404622 A | 4/2009 |
| CN | 101447929 A | 6/2009 |
| CN | 101496348 A | 7/2009 |

OTHER PUBLICATIONS

Lee, An Adaptive Flow-Level Load Control Scheme for Multipath Forwarding, 2001.*
Foreign Communication from a Related Counterpart Application, PCT Application PCT/CN2010/080307, International Search Report dated Mar. 31, 2011, 4 pages.
Foreign Communication from a Related Counterpart Application, PCT Application PCT/CN2010/080307, Written Opinion dated Mar. 31, 2011, 5 pages.

(Continued)

*Primary Examiner* — Kevin C Harper
*Assistant Examiner* — Samina Choudhry
(74) *Attorney, Agent, or Firm* — Conley Rose, P.C.; Grant Rodolph; Rayhao Chung

(57) ABSTRACT

An apparatus comprising a small flow forwarding module configured to distribute and forward a plurality of packets that correspond to a plurality of small flows over a plurality of paths, a large flow forwarding module configured to distribute and forward a plurality of packets that correspond to a plurality of large flows over the paths, and a packet header checking module in communication with the small flow forwarding module and the large flow forwarding module, wherein the packet header checking module is configured to inspect a flow indication in an incoming packet and forward the packet to the small flow forwarding module if the flow indication corresponds to one of the small flows or to the large flow forwarding module if the flow indication corresponds to one of the large flows.

19 Claims, 13 Drawing Sheets

(56) References Cited

OTHER PUBLICATIONS

Bryant, S., Ed., et al., "Flow Aware Transport of Pseudowires Over an MPLS PSN," draft-ietf-pwe3-fat-pw-00.txt, Jul. 1, 2009, 19 pages.

Hopps, C., "Analysis of an Equal-Cost Multi-Path Algorithm," RFC 2992, Nov. 2000, 8 pages.

Thaler, D., et al., "Multipath Issues in Unicast and Multicast Next-Hop Selection," RFC 2991, Nov. 2000, 9 pages.

Deering, S., et al., "Internet Protocol, Version 6 (IPv6) Specification," RFC 2460, Dec. 1998.

Bradner, S., "Key Words for Use in RFCs to Indicate Requirement Levels," BCP 14, RFC 2119 Mar. 1997.

Rosen, E., et al., "Multiple Protocol Label Switching Architecture," RFC 3031, Jan. 2001.

Faucheur, F. Le, et al., "Multi-Protocol Label Switching (MPLS) Support for Differentiated Services," RFC 3270, May 2002.

Rajahalme, J., et al., "IPV6 Flow Label Specification," RFC 3697, Mar. 2004.

Bryant, S., et al., "Pseudo Wire Emulation Edge-to-Edge (PWE3) Architecture," RFC 3985, Mar. 2005.

Swallow, G., et al., "Avoiding Equal Cost Multipath Treatment in MPLS Network", RFC 4928, Jun. 2007.

Davie, B., et al., "Explicit Congestion Marking in MPLS," RFC 5129, Jan. 2008.

Andersson, L., et al., "Multiprotocol Label Switching (MPLS) Label Stack Entry: "EXP" Field Renamed to "Traffic Class Field"," RFC 5462, Feb. 2009.

Bryant, S., et al., "Flow Aware Transport of Pseudowires Over an MPLS PSN," draft-ietf-pwe3-fat-pw-03, Jan. 2010.

Kompella K., et al., "The Use Entropy Labels in MPLS Forwarding," draft-kompella-mpls-entropy-label-01, Jul. 7, 2008.

Bocci, M., et al., "An Architecture from Multi-Segment Pseudowire Emulation Edge-to-Edge," RFC 5659, Oct. 2009.

Carpenter B., "Using the IPV6 Flow Label for Equal Cost Multipath Routing in Tunnels," draft-carpenter-flow-ecmp-01, Feb. 18, 2010.

"Internet Protocol—DARPA Internet Program—Protocol Specification," RFC 791, Sep. 1981.

Deering, S., et al., "Internet Protocol, Version 6 (IPv6) Specification," RFC 1883, Dec. 1995.

Bryant, S., et al., "Flow Aware Transport of Pseudowires Over an MPLS PSN," draft-ietf-pwe3-fat-pw-02, Oct. 24, 2009.

Yong, L., Ed., "Enhanced ECMP and Large Flow Aware Transport," draft-yong-pwe3-enhance-ecmp-1fat-01.txt, Mar. 5, 2010.

"The Cooperative Association for Internet Data Analysis," http://www.caida.org/data/index.xml, webpage last modified on Jan. 15, 2010.

\* cited by examiner

SYSTEM AND METHOD TO SUPPORT ENHANCED EQUAL COST MULTI-PATH AND LINK AGGREGATION GROUP

CROSS-REFERENCE TO RELATED APPLICATIONS

The present application claims priority to U.S. Provisional Patent Application No. 61/292,448, filed Jan. 5, 2010 by Lucy Yong et al., and entitled "System and Method to Support Enhanced ECMP and LAG," which is incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames from one node to another node across the network without using pre-configured routes on intermediate nodes. Other networks may forward the data frames from one node to another node across the network along pre-configured or pre-established paths.

In some networks, a plurality of traffic flows or streams can be distributed and forwarded over a group of paths that are coupled to a same destination node or next hop. For example, Internet Protocol (IP) and/or Multiprotocol Label Switching (MPLS) networks can use equal cost multi-path (ECMP) or Link Aggregation Group (LAG) schemes to send multiple flows to the same destination or next hop over a plurality of aggregated links or paths. In the ECMP or LAG technique, the different flows are distributed over the paths using hashing algorithms, e.g. as specified in Internet Engineering Task Force (IETF) Request for Comments (RFC) 2991 or 2992, both of which are incorporated herein by reference. The hashing algorithms distribute the different flows over the different paths and guarantee that the packets that correspond to the same flow are sent over the same path. The hashing algorithm may be suitable when a relative large quantity of flows is forwarded, e.g. which allows enough random flow distribution of the paths, and further when the variations between the rates for the different flows are relatively small.

SUMMARY

In one embodiment, the disclosure includes an apparatus comprising a small flow forwarding module configured to distribute and forward a plurality of packets that correspond to a plurality of small flows over a plurality of paths, a large flow forwarding module configured to distribute and forward a plurality of packets that correspond to a plurality of large flows over the paths, and a packet header checking module in communication with the small flow forwarding module and the large flow forwarding module, wherein the packet header checking module is configured to inspect a flow indication in an incoming packet and forward the packet to the small flow forwarding module if the flow indication corresponds to one of the small flows or to the large flow forwarding module if the flow indication corresponds to one of the large flows.

In another embodiment, the disclosure includes a network component comprising a large flow forwarding and congestion control module coupled to a plurality of aggregated paths and configured to distribute and forward a plurality of packets that correspond to a plurality of large flows over the aggregated paths and substantially maintain load balance over the aggregated paths, wherein the large flow forwarding and congestion control module stops forwarding a large flow that is assigned to a path in the aggregated paths if the path becomes substantially congested, and discards or caches the large flow packets or redirects the large flow to a second path.

In another embodiment, the disclosure includes a network component comprising at least one processor coupled to a memory and configured to detect a large flow indication in a received packet, forward the packet to one of a plurality of aggregated paths based on a first flow forwarding algorithm if the large flow indication indicates that the packet does not correspond to a small flow, and forward the packet to one of the paths based on a second flow forwarding algorithm if the large flow indication indicates that the packet corresponds to a large flow.

In another embodiment, the disclosure includes a method comprising receiving a packet that corresponds to a flow at an edge node in a network, configuring a large flow indication in the packet to indicate that the flow is a large flow or a small flow, and forwarding the packet to an internal node in the network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Current Internet traffic may comprise relatively low rate flows, such as web browsing or audio data, and high rate flows that may be substantially higher than the small flow rates, such as video or streaming data. The large rate flows may correspond to relatively large flows that comprise larger amounts of data than the low rate flows. The quantity of large flows that have relatively high rates may be substantially smaller than the quantity of small flows that have lower rates but may still consume a significant portion of overall transport capacity, e.g. bandwidth. For example, the large flows may comprise about two percent of the total Internet traffic and consume about 30 percent of transport capacity and the small flows may comprise about 98 percent of the traffic and consume about 70 percent of transport capacity. Such mixed rate and uneven amount of traffic flows may not be efficiently distributed or evenly balanced over multiple paths using conventional hashing based techniques, such as ECMP and LAG, since the hashing algorithms may not consider the flow rates, quality of service (QoS) requirements, or both. Thus, using such techniques may sometimes cause traffic congestion, poor network utilization, network instability, transport or link failures, or combinations thereof.

Disclosed herein is a system and method for improving flow distribution over a plurality of paths using ECMP, LAG, or similar techniques that may use hashing algorithms to assign different flows over multiple paths. The flows may comprise large flows and small flows and may comprise pseudowire (PW) packets, Label Switched Path (LSP) packets, or IP packets. The large flows may be distinguished from the small flows, e.g. at a network edge, by configuring a flow indication label in the packets. The flows may then be received, e.g. at a network node, and separated into large flows and small flows based on the flow indication label. The small flows may then be distributed over a plurality of paths based on a first distribution scheme for small flows, e.g. based on conventional ECMP or LAG methods. The large flows may be distributed over the same paths based on a second distribution scheme for large flows. As such, the traffic combining small flows and large flows can be distributed efficiently and about evenly over the paths.

Figure 1:
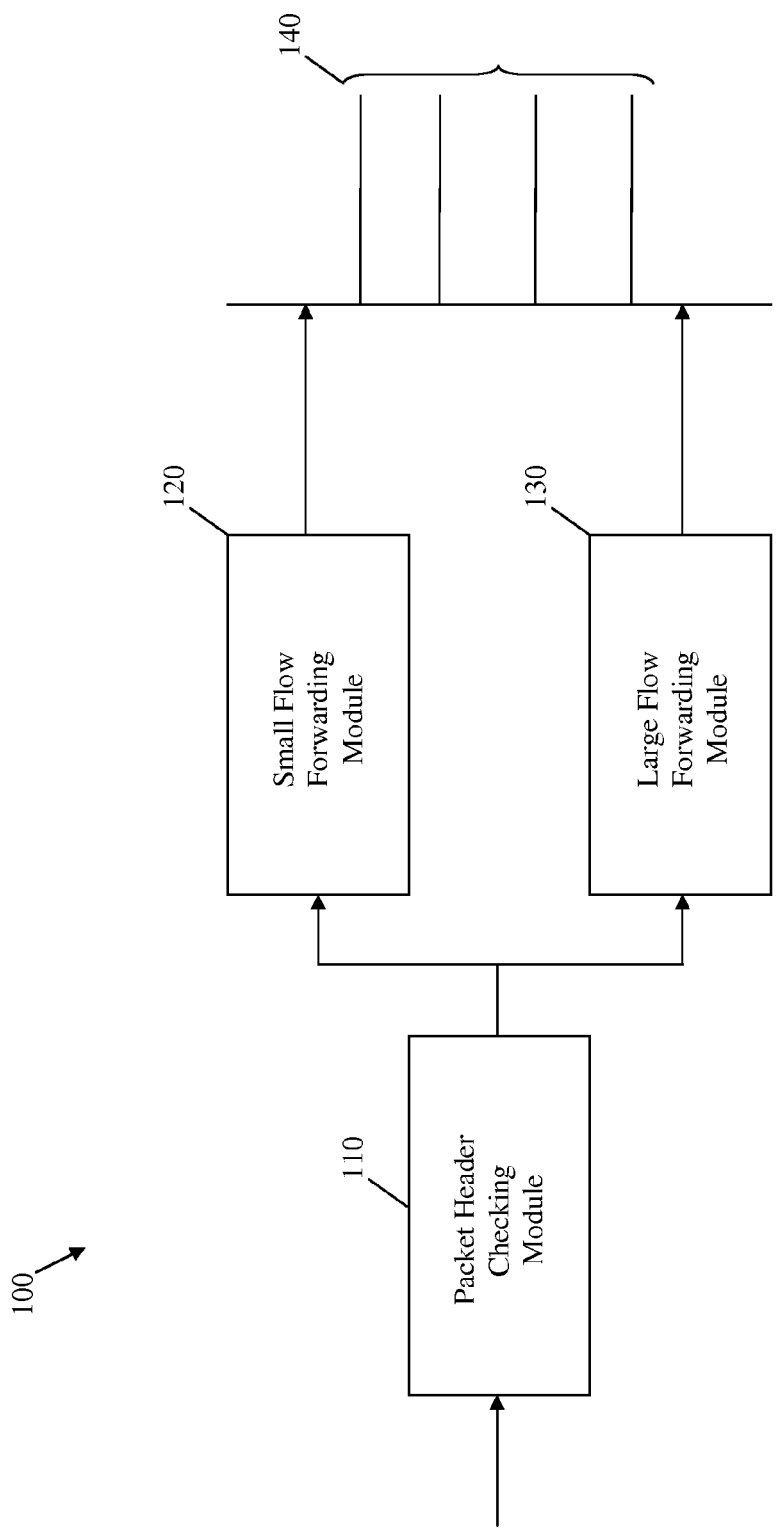
FIG. 1 is a schematic diagram of an embodiment of a flow forwarding system.

FIG. 1 illustrates an embodiment of a flow forwarding system 100, which may be used for distributing and forwarding a plurality of small flows and large flows over a plurality of paths in a network, such as a packet switched network (PSN). The flow forwarding system 100 may comprise a packet header checking module 110, a small flow forwarding module 120, a large flow forwarding module 130, and a plurality of paths 140. Each of the small flow forwarding module 120 and the large flow forwarding module 130 may be positioned between the packet header checking module 110 and the paths 140 in parallel, as shown in FIG. 1. The packet header checking module 110, the small flow forwarding module 120, and the large flow forwarding module 130 may be implemented using software, hardware, or both. For example, the modules may comprise any number of code blocks, circuits, and/or network cards. The packet header checking module 110, the small flow forwarding module 120, and the large flow forwarding module 130 may be coupled to or located in any node in the network, such as a switch, a router, or a bridge. Further, the packet header checking module 110 may be coupled to an ingress port of the node and the paths 140 may be coupled to an egress port or a plurality of egress ports of the node.

The packet header checking module 110 may be configured to receive the small flows and the large flows, e.g. from the ingress port, and distinguish between the small flows and the large flows by detecting a flow indication label in the packets of the small flows and the large flows. The flow indication labels in the packets may be configured, e.g. at a provider edge (PE), prior to sending the flow packets to the ingress port, as described below. The packet header checking module 110 may forward the packets to the small flow forwarding module 120 if the flow indication label in the packets indicate a small flow or to the large flow forwarding module 130 if the flow indication label in the packets indicate a large flow. Thus, the packet header checking module 110 may separate the small flows forwarding process from the large flows forwarding process. Separating the small flows forwarding process from the large flows forwarding process may improve load balancing at the paths 140 in comparison to conventional forwarding methods, e.g. ECMP or LAG, where both small flows and large flows are treated similarly.

The small flow forwarding module 120 may be configured to receive the small flows from the packet header checking module 110 and distribute and forward the small flows over the paths 140. The small flow forwarding module 120 may use a multi-path or multi-link forwarding method, e.g. ECMP or LAG, based on conventional hashing schemes to assign the different small flows to different paths 140. For example, the small flows may be hashed over the paths 140 based on their label stack, IP address and other fields in header, or Media Access Control (MAC) addresses. Since the small flows may have about equal rates and/or comprise comparable amount of data (e.g. may be about equal in size), the hashing process may distribute the small flows about evenly over the paths 140. The details of how the hashing algorithm can evenly distribute the number of small flows over different paths may be described in the prior art and outside the scope of this disclosure.

The large flow forwarding module 130 may be configured to receive the large flows from the packet header checking module 110 and distribute and forward the large flows over the paths 140. The large flow forwarding module 130 may use a flow forwarding table to assign the different large flows to different paths 140. The large flows may be distributed over the paths about evenly, e.g. based on the available bandwidths on the paths 140. For instance, the large flow forwarding module 130 may check the current load on each path 140 and select the least used path 140 to forward an incoming large flow. Alternatively, the large flow forwarding module 130 may use any other forwarding algorithm that guarantees about equal load balancing of the large flows over the paths 140. When assigning the large flows to the paths 140, the large flow forwarding module 130 may take into consideration the assignment of small flows to the paths 140, e.g. by the small flow forwarding module 120. As such, the total load for large flows and small flows may be substantially balanced over the paths 140.

In other embodiments, the large flows and the small flows may be distributed and forwarded by the large flow forwarding module 130 and the small flow forwarding module 120, respectively, using other schemes. For instance, the large flow forwarding module 130 may distribute and forward the large flows on a first subset of the paths 140 and the small flow forwarding module 120 may distribute and forward the small flows on a second subset of the paths 140. The large flow forwarding module 130 and the small flow forwarding module 130 may also distribute and forward some of the large flows and the small flows, respectively, over a shared subset of the paths 140.

Figure 2:
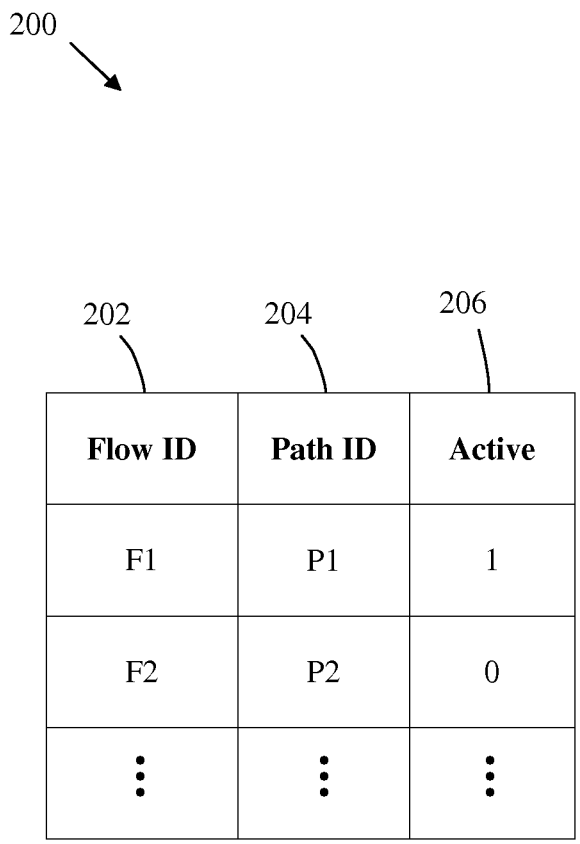
FIG. 2 is a schematic diagram of an embodiment of a flow forwarding table.

FIG. 2 illustrates an embodiment of a flow forwarding table 200, which may be used to distribute and forward a plurality of large flows over a plurality of paths. For example, the flow forwarding table 200 may be stored and maintained at the large flow forwarding module at a network node (e.g. the large forwarding module 130) to assign the different large flows to the different paths 140. The forwarding flow table 200 may comprise a flow identifier (ID) column 202, a path ID column 204, and an active status column 206. The flow ID column 202 may comprise a plurality of IDs (e.g. F1, F2) that uniquely indicate a plurality of large flows. The flow ID may be obtained from the packets of the flow, e.g. from a label in the packets as described below. The path ID column 204 may comprise a plurality of IDs (e.g. P1, P2) that uniquely indicate a plurality of paths for forwarding the large flow (e.g. the paths 140). The active status column 206 may indicate an active association between a flow and a path when the flow is being transported over the path.

When the large flow forwarding module receives a large flow, a flow ID in the packets of the large flow may be detected. If the large flow forwarding module finds the flow ID in the flow forwarding table 200, the large flow may be forwarded over the path indicated by the path ID in the table entry corresponding to the flow ID. Additionally, the large flow forwarding module may set the active status in the corresponding table entry to an active value (e.g. about one) that indicates that the large flow is being transported over the path. However, if the flow ID is not found in the flow forwarding table 200, the large flow forwarding module may select one of the paths, e.g. using a forwarding algorithm suitable for large flows as described above, and add a new entry to the flow forwarding table for the new large flow. The new entry may comprise the flow ID of the large flow and the path ID of the selected path. Additionally, the active status in the new entry may be set to the active value to indicate that the large flow is being forwarded over the selected path. As such, the large flow forwarding module may keep track of the received large flows and the corresponding paths used to forward the large flows.

Additionally, the entries in the flow forwarding table 200 may be aged to remove or disable any entry that may not be active, e.g. that corresponds to a path which no longer transmits an assigned large flow. As such, the large flow forwarding module may periodically or intermittently scan the table entries or rows, and check the active status for each entry. If the active status comprises an active value (e.g. about one), the active status may be changed to an aging value (e.g. about zero). However, if the active status comprises the aging value, the table entry may be removed from the flow forwarding table 200. The aged value may indicate that the large flow that corresponds to the table entry has not been received for a period of time. Therefore, the large flow may be considered terminated or changed to a small flow, which may then be forwarded by the small flow forwarding module instead of the large flow forwarding module. This aging process based on the active status may limit the size of the flow forwarding table 200 and prevent the flow forwarding table 200 from unnecessarily expanding by removing the outdated entries that correspond to the terminated or completed forwarding assignments. The frequency for scanning the flow forwarding table 200 and determining the aging entries may be adjusted, e.g. according to the expected transmission times for the large flows, the network operations requirements, and/or other criteria.

In an embodiment, the large flow forwarding module may stop forwarding a large flow over an assigned path if the path becomes congested. The packets of the large flow that are assigned to the congested path may be redirected to another path or discarded, e.g. instead of discarding random flow packets or small flow packets. Handling some of the large flows in such a manner may effectively control the congestion situation and, thus less applications or services may be impacted when congestion occurs in one of the aggregated paths. The large flow forwarding module may also select the large flows that may be redirected to another path based on the QoS of the flows. Additionally or alternatively, the large flow forwarding module may cache some of the large flow packets assigned to the congested path, e.g. temporarily, and then transmit the cached packets when path congestion is resolved. In the case of a path failure, the large flows associated with the failed path may be reassigned to another path, which may be selected using a forwarding algorithm that guarantees about equal load balancing of the remaining paths. Further, if a new path is added to the group of aggregated paths, the large flows may be reassigned to the paths including the new path to guarantee about equal load balancing over the new set of paths. The flow may be redirected or reassigned to a new path by changing the path ID in the corresponding entry of the flow forwarding table 200.

As described above, the small flow forwarding and large flow forwarding processes may be separated using a flow indication label in the packets of the flows. The flow indication label may be configured at an edge node in a network, e.g. a PE in an MPLS network, before sending the flows to a flow forwarding system, such as the flow forwarding system 100. When the PE receives a flow comprising a plurality of packets, e.g. for an external network or external node, the PE may use a large flow recognition scheme to determine whether the packets correspond to a large flow or a small flow. For example, the PE may use a protocol inspection, a flow volume measurement, a configured access list (ACL), or combinations thereof to determine whether the incoming flows are large flows. The large flows may be recognized as the top rate ranked flows, which may be determined by the network operator, and accordingly the small flows may comprise the remaining flows. For example, the large flows may correspond to the flows that have the top percent rates among the flows in the network traffic, e.g. about five percent, about ten percent, or about 20 percent of the top rates. As such, the flow forwarding system may separate some of the higher rate flows to effectively compensate uneven load balance over paths, which may be caused by the hashing process. Selecting a subset of the high rate flows in the traffic may improve the load balance even in the case of substantially large amount of high rate flows in the traffic.

If the flow is recognized as a large flow, the PE may configure a flow indication label in the packets of the flow to indicate to the flow forwarding system that the packets correspond to a large flow. The packets may then be sent to any network node that comprises the flow forwarding system. The flow forwarding system in the network node may then detect the flow indication label in the packets and implement the large flow forwarding process accordingly. Since the large flow recognition process is implemented at the PE before forwarding the flow packets to the network nodes, the large flow recognition process may not be needed in the network nodes, which may substantially reduce cost and processing resources. Additionally, configuring the flow indication label by the PE instead of an external network or external node may prevent the external network or external node from controlling or deciding the flow forwarding process in the network nodes and therefore improve network security.

In some embodiments, the packets received at the PE may not comprise a flow label, such as in the case of IP packets and LSP packets. As such, the PE may configure a field or a portion in the packet to indicate that the packet corresponds to a large flow or a small flow. The packet may then be sent to any network node that comprises the flow forwarding system. The flow forwarding system in the network node may then detect the flow indication in the configured field and implement the large flow forwarding process or the small flow forwarding process accordingly.

In an embodiment, the PE may recognize the large flow packets based on a configured policy, such as a protocol type or access list. For instance, when the PE receives the packets from an external network, the PE may inspect a packet header in the packets to determine if the packet header meets large flow criteria. If the packet header meets large flow criteria, the PE may then mark the corresponding packet as large flow packet.

In an embodiment, the PE may store and maintain a large flow table, which may comprise a list of large flows that are received at the PE. The large flow table may be updated, e.g. periodically or regularly, to ensure that the list of large flows comprises the active large flows that are still being received by the PE, but not the large flows that have been previously received and terminated. For instance, each entry in the large flow table may comprise a flow ID and an active status for a large flow. The large flow table may be aged using the active status to remove or disable the entries that are no longer active, e.g. which correspond to large flows that are no longer received by the PE. The PE may periodically or intermittently scan the large flow table entries or rows, and check the active status for each entry. If the active status comprises an active value (e.g. about one), the active status may be changed to an aging value (e.g. about zero). Alternatively, if the active status comprises the aging value, the table entry may be removed from the large flow table.

In an embodiment, the PE may buffer the flow traffic received from an external network or node, e.g. to avoid out of sequence flows due to changing the flow traffic path. If the PE uses flow rate measurements to determine the large flows, the packets of some of the flows may be initially treated as small flow packets and subsequently treated as large flow packets, e.g. due to changes in the flow rate measurements. In this case, small flow forwarding and large flow forwarding may not guarantee the same path for the same flow, which may cause out of sequence flows, for instance temporarily. Caching a newly recognized large flow for a relatively short time may avoid out of sequence flows.

Using current packet processing technologies, the large flow recognition process may be implemented with high speed, e.g. with respect to traffic transmission speeds. As such, the received flow packets may be processed and forwarded as large or small flow packets on the paths that are associated with the same flows, e.g. without distributing the packets of the same flow over a plurality of paths. The large flow recognition process may also use any caching technology to avoid sending packets out of sequence (or order). For example, the PE may cache the received flow packets and hence forward the cached packets to the network nodes.

Additionally, the PE may be configured to recognize the different flows and add flow labels to the flow packets to distinguish the individual flows, e.g. as described in Internet Engineering Task Force (IETF) document draft-ietf-pwe3-fat-pw-03.txt, which is incorporated herein by reference as if reproduced in its entirety. The PE may implement a flow recognition process to identify and distinguish between the received flows, which may comprise both large flows and small flows. Such flow recognition process to identify both the small and large flows may be different from the large flow recognition process to distinguish between the large flows and the small flows. The PE may implement both the flow recognition process using flow labels to distinguish the individual flows and the large flow recognition process using flow indication on flow labels or different flow labels to separate the large flows from the small flows.

Figure 3:
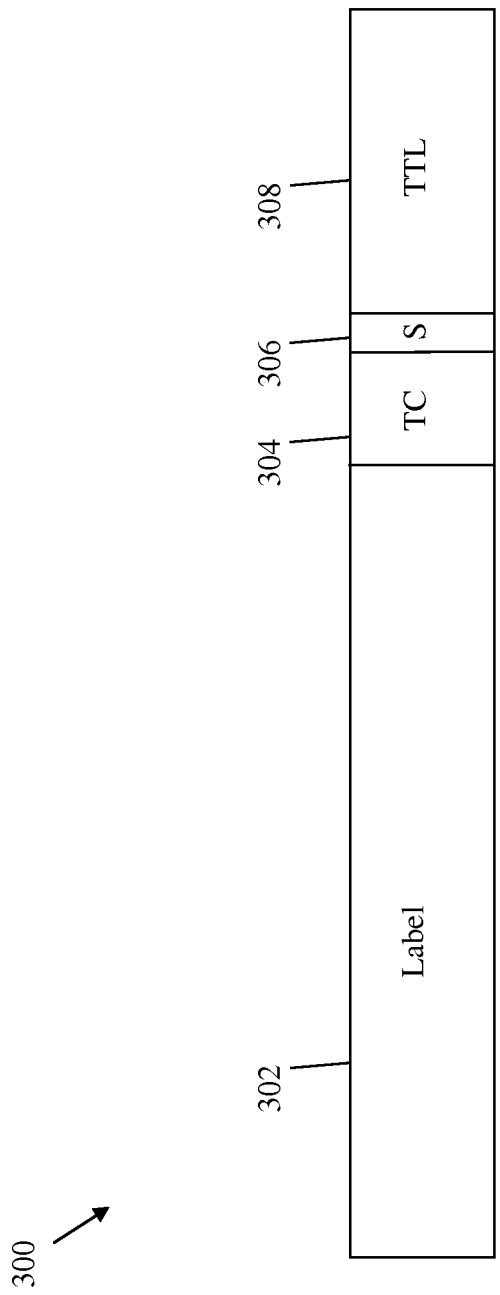
FIG. 3 is a schematic diagram of an embodiment of a flow label.

FIG. 3 illustrates an embodiment of a flow label 300, which may be a flow label. The flow label 300 may be used in a PW packet to indicate whether the corresponding flow is a large flow or a small flow. The flow label 300 may be configured by the PE before sending the packet to a flow forwarding system, e.g. in a network node. The flow label 300 may comprise a label 302, a traffic class (TC) 304, a bottom of stack bit (or S flag) 306, and a time to live (TTL) field 308. The label 302 may be used to identify an individual flow, e.g. may comprise a flow ID that uniquely identifies the flow. The TC 304 may be used to indicate a class or type of traffic. The S flag 306 may be set, e.g. to about one, to indicate that the flow indication label 300 is placed at the bottom of a label stack in the packet. Typically, the flow label 300 may be placed at the bottom of the label stack and as such the TTL field 308 may not be used. The label 302 may have a size of about 20 bits, the TC 304 may have a size of about three bits, and the TTL field 308 may have a size of about eight bits.

In an embodiment, about one bit of the TC 304 may be set, e.g. to about one, to indicate a large packet. The remaining bits of the TC 304 may be reserved and may not be used. Additionally, the TTL field 308 may be used to distinguish the flow label 300 from other labels that may also be placed at the bottom of the label stack, such as other flow labels, PW labels and/or LSP labels. The TTL field 308 may comprise a value, e.g. about zero, that indicates that the flow label 300 is a flow indication label.

Figure 4:
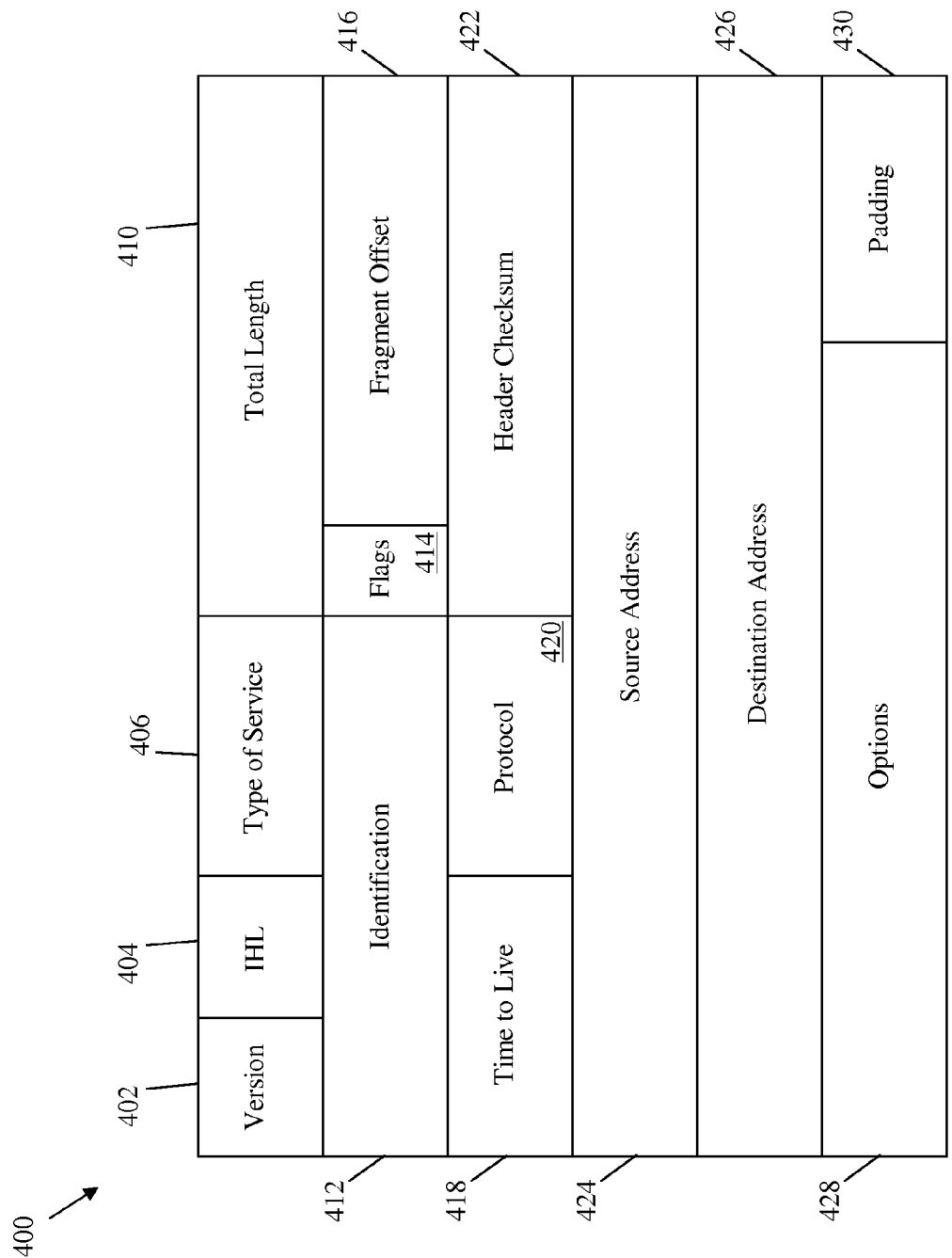
FIG. 4 is a schematic diagram of an embodiment of an IP header.

FIG. 4 illustrates an embodiment of an IP header 400 in an IP packet. The IP header 400 may be used to indicate whether the IP packet corresponds to a large flow or a small flow. The IP header 400 may be configured by the PE before sending the IP packet to a node in the network. The IP header 400 may comprise a version field 402, an Internet Header Length (IHL) 404, a type of service field 406, a total length 410, an identification field 412, a plurality of flags 414, a fragment offset field 416, a time to live field 418, a protocol field 420, a header checksum 422, a source address 424, a destination address 426, an option 428, and optionally a padding 430. The fields of the IP header 400 is similar to the IP header described in RFC 791 for IP version 4 (IPv4), which is incorporated herein by reference. The type of service field 406 may have a size of about eight bits and may be used to indicate QoS parameters for the corresponding traffic. However, one of the bits of the type of service field 406 may not be used or defined, e.g. bit number six. In an embodiment, this bit may be used to indicate whether the corresponding packet belongs to a large flow or a small flow. For example, the bit number six may be set to about one to indicate that the IP packet that comprises the IP header 400 corresponds to a large flow or to about zero to indicate that the IP packet corresponds to a small flow. Since IPv4 protocol does not have a flow label field, the operator may determine which field in the header can be used as a "flow ID". For example, the source address 424, the destination address 426, and the protocol field 420 may be used as a flow ID.

Figure 5:
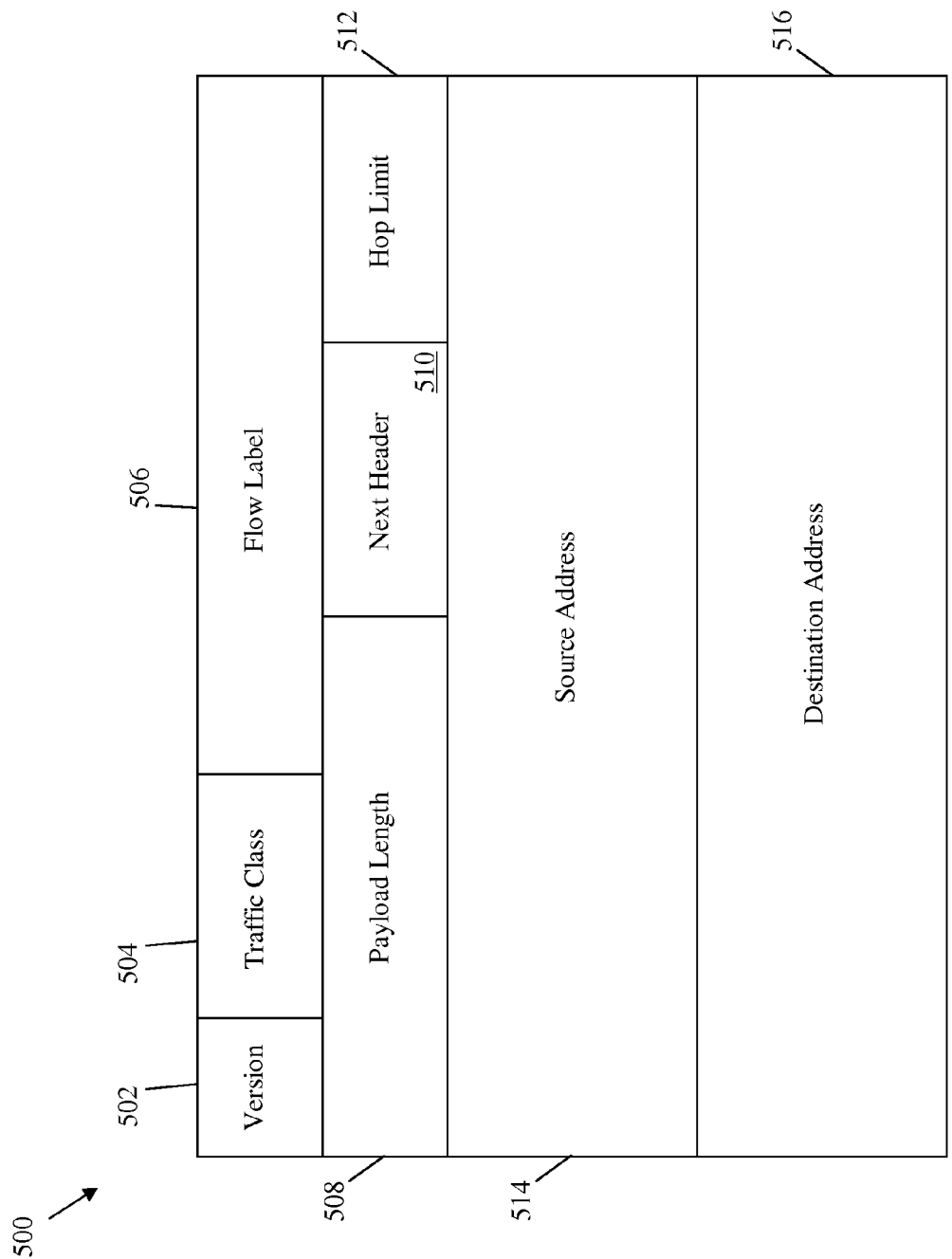
FIG. 5 is a schematic diagram of another embodiment of an IP header.

FIG. 5 illustrates an embodiment of another IP header 500 that may be used to indicate whether an IP packet that comprises the IP header 500 corresponds to a large flow or a small flow. The IP header 500 may be configured by the PE before sending the IP packet to a node in the network. The IP header 500 may comprise a version field 502, a TC field 504, a flow label 506, a payload length 508, a next header 510, a hop limit field 512, a source address 514, and a destination address 516. The fields of the IP header 500 is similar to the IP header described in RFC 2460, which is incorporated herein by reference, for IP version 6 (IPv6). The version field 502 may have a size of about four bits and may have a value equal to six to indicate an IPv6 packet. The TC field 504 may also have a size of about eight bits, of which some bits may not be used or defined. The flow label 506 may have a size of about 20 bits and may comprise information about the corresponding flow. In an embodiment, one unused bit in the TC filed 504 may be used to indicate whether the IP packet that comprises the IP header 500 corresponds to a large flow or a small flow. For example, one unused bit in the TC filed 504 may be set to about one to indicate that the IP packet that comprises the IP header 500 corresponds to a large flow or to about zero to indicate that the IP packet corresponds to a small flow.

In an embodiment, a network edge node may receive LSP packets that comprise entropy labels and correspond to large or small flows. As such, the network edge node may configure the entropy labels in the LSP packets to indicate whether the packets correspond to large or small flows before forwarding the packets to a network node. For example, a Label Edge Router (LER) may receive a LSP packet that corresponds to a large flow and use the entropy label in the packet to indicate to a Label Switched Router (LSR) in the network that the LSP packet is a large flow packet.

Typically, the entropy label may be used to identify the individual flows that correspond to the packets at the LER, e.g. as described in IETF document draft-kompella-mpls-entropy-label-01.txt, which is incorporated herein by reference. The entropy label in LSP packets may be substantially similar to the flow label 300 used in PW packets. As such, the LER may set one of the bits of a TC field in the entropy label, e.g. to about one, to indicate a large or small flow. The remaining bits of the TC may be reserved and may not be used. The LER may also configure a TTL field in the entropy label to distinguish the entropy label from other labels that may be placed at the label stack in the packet. In the case where the LSR may not handle separate large flow and small flow forwarding schemes, e.g. may not comprise a large flow forwarding module, the LER may set the TC bit to about zero.

Figure 6:
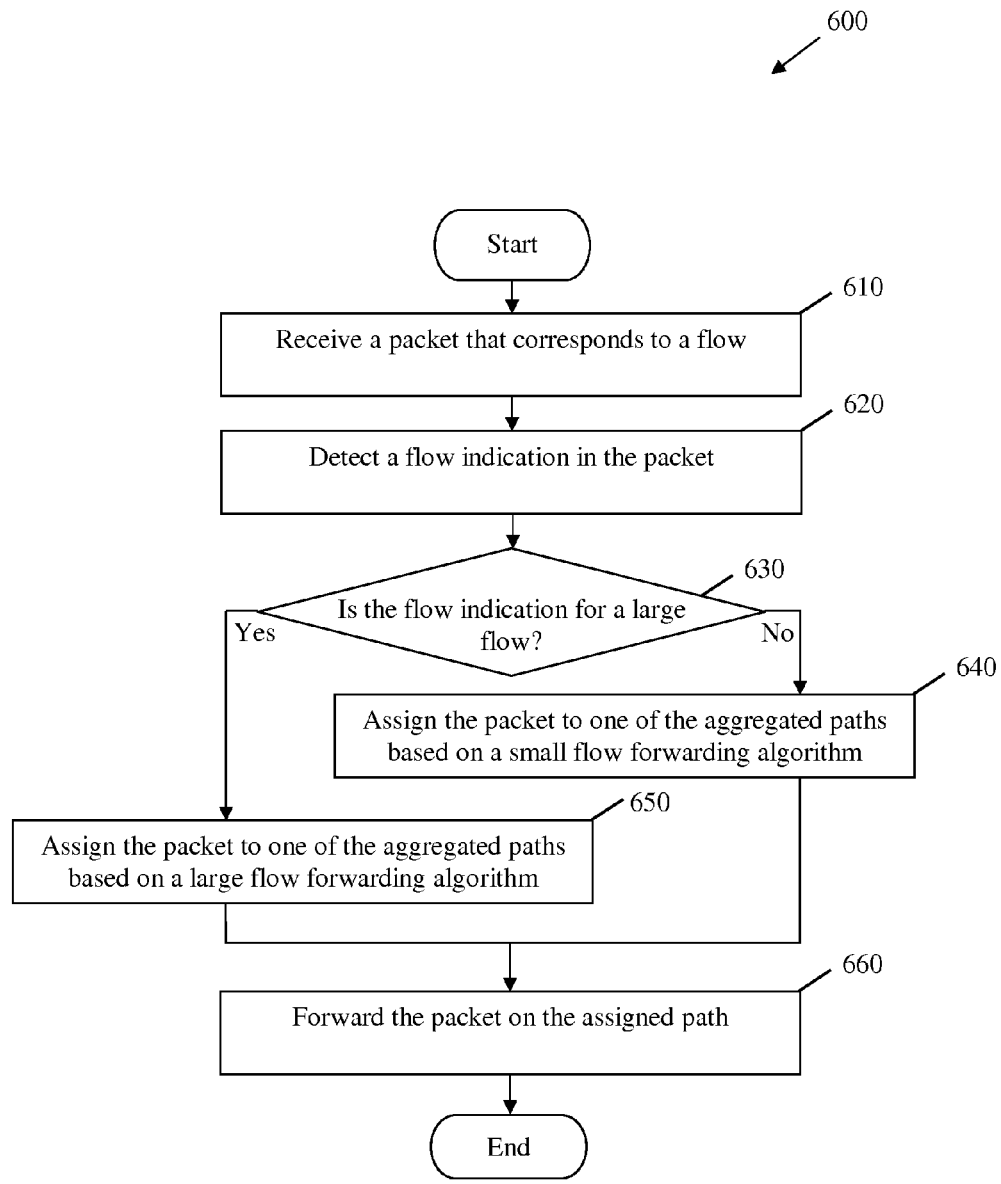
FIG. 6 is a flowchart of an embodiment of a flow forwarding method.

FIG. 6 illustrates an embodiment of a flow forwarding method 600, which may be used by a flow forwarding system in a network node to forward a plurality of received large flows and small flows over a plurality of aggregated paths. For example, the forwarding system 100 may use the flow forwarding method 600 to forward a plurality of large and small flows over the paths 140. The flow forwarding method 600 may begin at block 610, where a packet that corresponds to a flow may be received, e.g. at the node's ingress. For instance, the packet may be a PW packet, a LSP packet, or an IP packet that is received from a PE or LER. At block 620, a flow indication in the packet may be detected. The flow indication may be a flow label, an entropy label, or a field in an IP header.

At block 630, the method 600 may determine whether the flow indication is for a large flow. For example, the flow indication may comprise a bit or field that is set to one to indicate that the packet corresponds to a large flow. If the flow indication is for a large flow, then the method 600 may proceed to block 650. If the condition in block 630 is not satisfied, then the method 600 may proceed to block 640.

At block 640, the packet may be assigned to one of the aggregated paths, e.g. at the node's egress, based on a small flow forwarding algorithm. The small flow that comprises the packet may be assigned to one of the paths based on a hashing based technique, e.g. using ECMP or LAG. As such, the received packet and other received packets that correspond to the same small flow may be assigned to the same path. The method 600 may then proceed to block 660. Alternatively, at block 650 the packet may be assigned to one of the aggregated paths based on a large flow forwarding algorithm. The large flow that comprises the packet may be assigned to one of the paths based on the large flow forwarding process using a large flow table, as described below. As such, the received packet and other received packets that correspond to the same large flow may be assigned to the same path. At block 660, the packet may be forwarded on the assigned path, and the method 600 may then end. The packets that correspond to a large flow and the packets that correspond to a small flow may be forwarded on the same path or on different paths.

Figure 7:
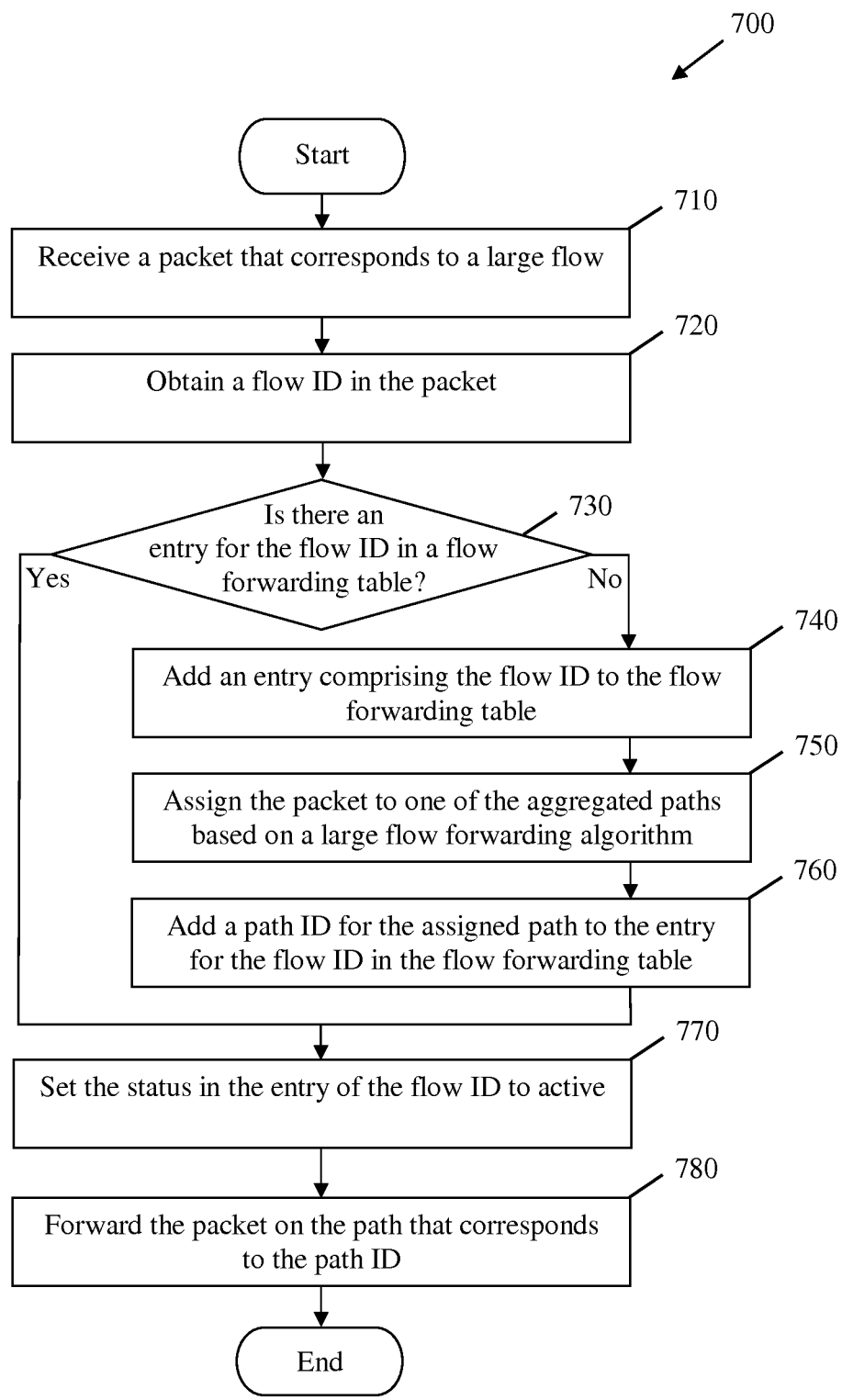
FIG. 7 is a flowchart of an embodiment of a large flow forwarding method.

FIG. 7 illustrates an embodiment of a large flow forwarding method 700, which may be used by a large flow forwarding module in a large flow forwarding system to forward a plurality of received large flows over a plurality of aggregated paths. For example, the large flow forwarding module may use the large flow forwarding method 700 to forward a plurality of large flows over the paths. The large flow forwarding method 700 may begin at block 710, where a packet that corresponds to a large flow may be received, e.g. from a packet header checking module. At block 720, a flow ID in the packet may be obtained. The flow ID may be used to uniquely identify the individual large flow. At block 730, the method 700 may determine whether there is an entry for the flow ID in a flow forwarding table. The flow forwarding table may comprise a plurality of entries that comprise a plurality of flow IDs for a plurality of large flows. If the flow forwarding table comprises an entry for the flow ID in the packet, then the method 700 may proceed to block 770. If the condition in block 730 is not satisfied, then the method 700 may proceed to block 740.

At block 740, an entry comprising the flow ID may be added to the flow forwarding table. The new entry is added since a new flow ID that corresponds to a new large flow is detected. At block 750, the packet may be assigned to one of the aggregated paths based on a large flow forwarding algorithm. At block 760, a path ID for the assigned path may be added to the entry of the flow ID in the flow forwarding table. At block 770, the status in the entry of the flow ID may be set to active. In the case of adding a new entry for the flow ID, the active status may signal that the path begins forwarding the packet and other packets that correspond to the same large flow. In the case of finding an existing entry for the flow ID, the active status may signal that the path continues forwarding the large flow packets and is not aged out. At block 780, the packet may be forwarded on the path that corresponds to the path ID, and the method 700 may then end.

Figure 8:
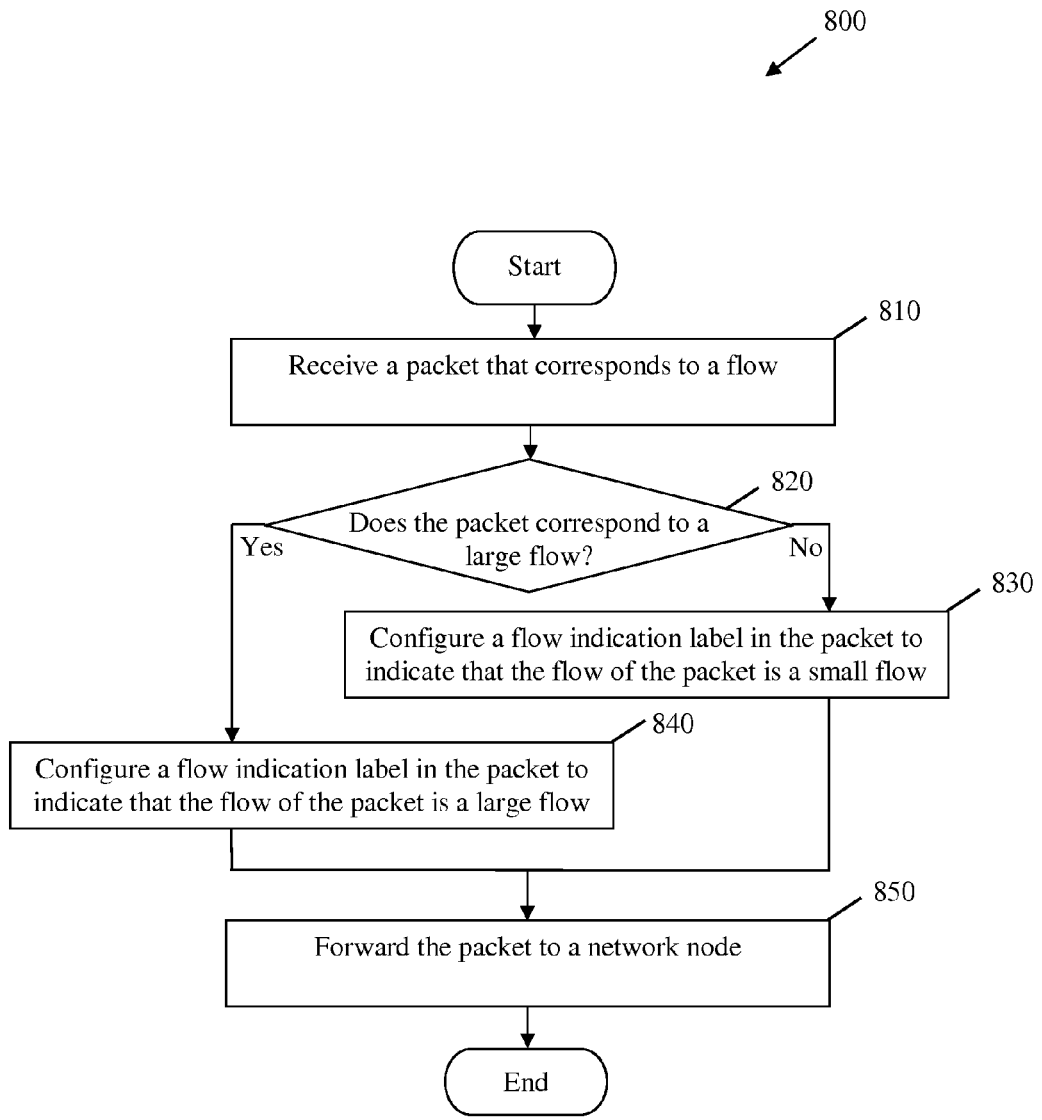
FIG. 8 is a flowchart of an embodiment of a flow indication method.

FIG. 8 illustrates an embodiment of a flow indication method 800, which may be used by a PE or LER to mark packets received from an external network or node as large flow packets or small flow packets. The PE or LER may then forward the packets to a network node or LSR, where the packets may be forwarded over a plurality of aggregated paths, e.g. using the flow forwarding method 600. The large flow forwarding method 800 may begin at block 810, where a packet that corresponds to a flow may be received. At block 820, the method 800 may determine whether the packet corresponds to a large flow. For example, the PE or LER may use a flow volume measurement or other technique to determine if the flow that corresponds to the packet has a rate among the top ranked rates, e.g. the top five percent rates. If the packet corresponds to a large flow, then the method 800 may proceed to block 840. If the condition in block 820 is not satisfied, then the method 800 may proceed to block 830.

At block 830, a flow indication label in the packet may be configured to indicate that the flow of the packet is a small flow. For example, a bit in a flow indication label or an entropy label in the packet may be set to about zero to indicate that the packet corresponds to a small flow. Alternatively, a service class bit in an IPv4 header or TC bit in an IPv6 header of the packet may be set to about zero to indicate that the flow of the packet is a small flow. Alternatively, at block 840 a flow indication label in the packet may be configured to indicate that the flow of the packet is a large flow. For example, the in the flow indication label, entropy label, or IP header may be set to about one to indicate that the packet corresponds to a large flow. At block 850, the packet may be forwarded to a network node and the method 800 may then end.

Figure 9:
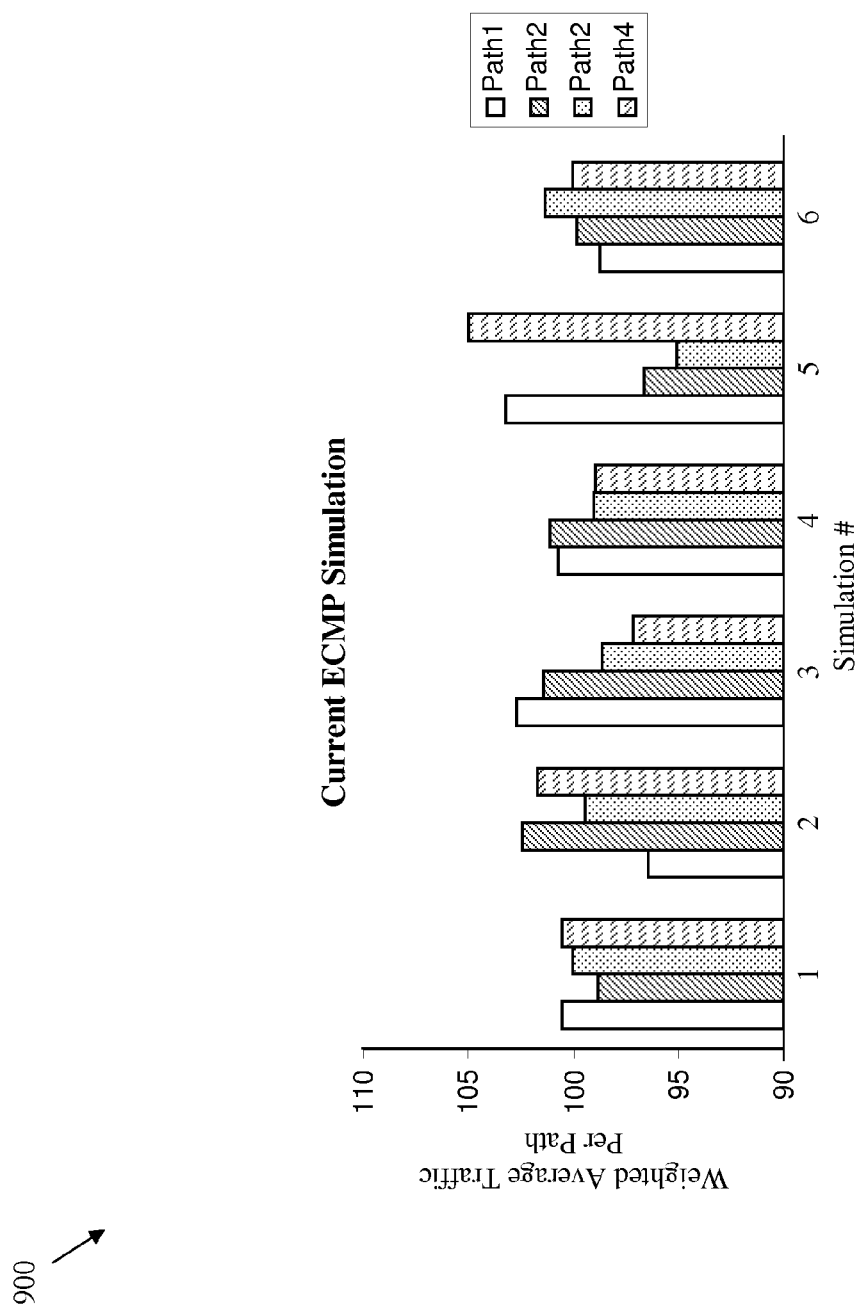
FIG. 9 is a chart showing simulated flow distribution results.

FIG. 9 illustrates an embodiment of a simulated flow distribution 900, where a plurality of flows that comprise large flows and small flows were generated to simulate typical Internet traffic. Specifically, the large flows comprise about two percent of the total Internet traffic and occupy about 30 percent of the traffic volume. The small flows comprise about 98 percent of the Internet traffic and occupy about 70 percent of the traffic volume. The flow rates for the large flows and the small flows were randomly generated. The generated flows were then distributed over four ECMP paths using the conventional ECMP technique. The simulation was repeated six times, where each time random flows were generated and then distributed over the same four paths.

FIG. 9 shows the distribution of the flows over the four paths for the six simulations. As shown, the weighted average traffic obtained from distributing the traffic varies substantially over each of the four paths. This uneven or unbalanced distribution of traffic is observed in each one of the six simulations, since the conventional ECMP technique uses hashing to distribute the traffic without separating or distinguishing between the large flow and the small flows. The average volume difference between the four paths was approximated at about ten percent using the results obtained in the six simulations. This difference in Internet traffic distribution may cause poor network utilization and reduce service quality.

Figure 10:
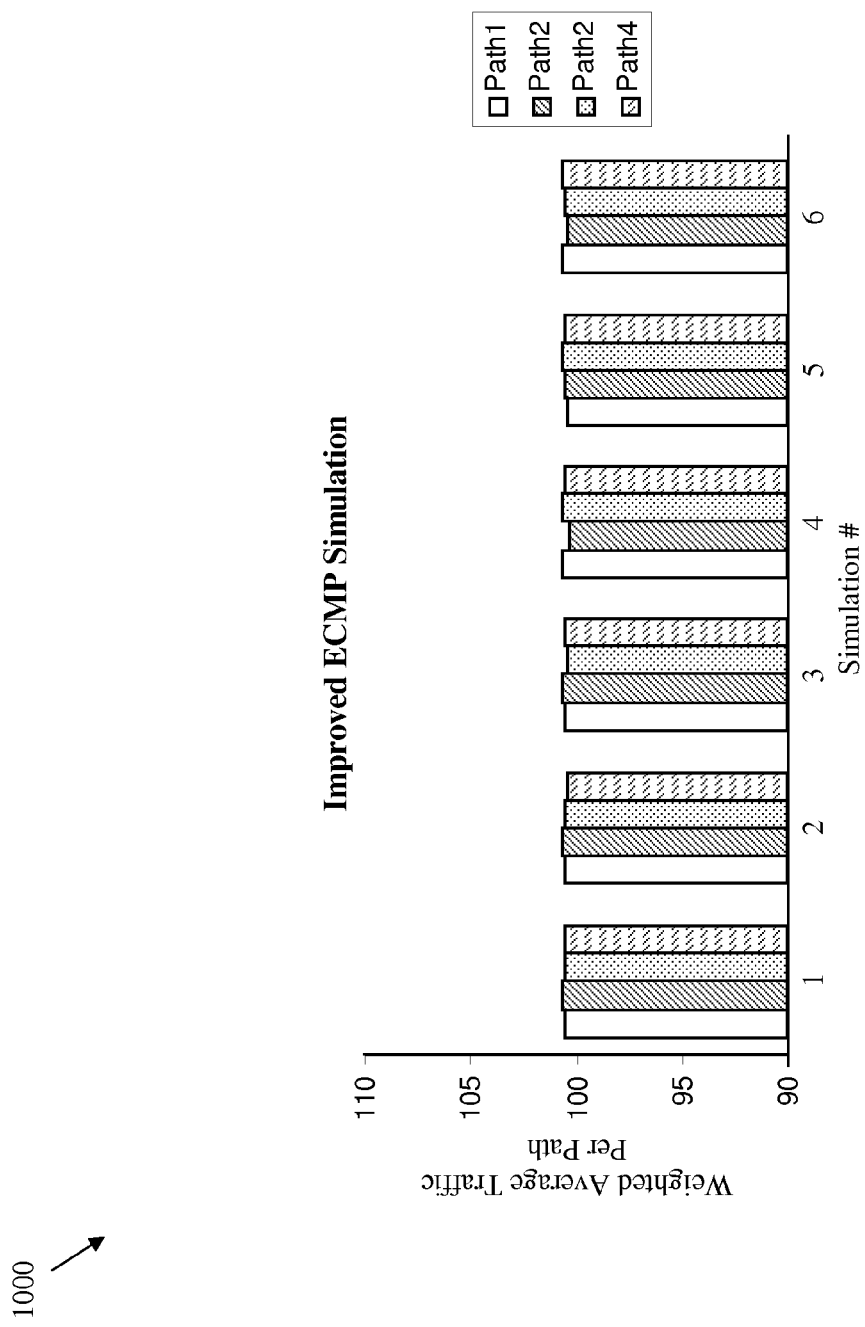
FIG. 10 is a chart showing simulated flow distribution results.

FIG. 10 illustrates an embodiment of another simulated flow distribution 1000, where the same large flows and small flows that were generated in the simulated flow distribution 900 were used. However, the generated flows were distributed over the four ECMP paths using an improved ECMP technique that handles the large flows and the small flows separately, e.g. using the methods 600 and 700. The simulation was repeated six times, where each time the same random flows of FIG. 9 were distributed over the same four paths using the improved ECMP technique.

In comparison to the flow distribution in FIG. 9, FIG. 10 shows a substantial improvement in traffic distribution over the four paths in each of the six simulations. As shown in FIG. 10, the weighted average traffic obtained is substantially equal over the four paths. This improved traffic distribution is observed in each one of the six simulations, which may indicate that separating the large flow distribution and the small flow distribution may improve total traffic distribution independent of the content of the flows. The average volume difference between the four paths was approximated at less than about one percent using the results obtained in the six simulations. This improvement in traffic distribution is about ten times that of the conventional ECMP technique and may substantially improve network utilization and service quality for Internet traffic.

Figure 11:
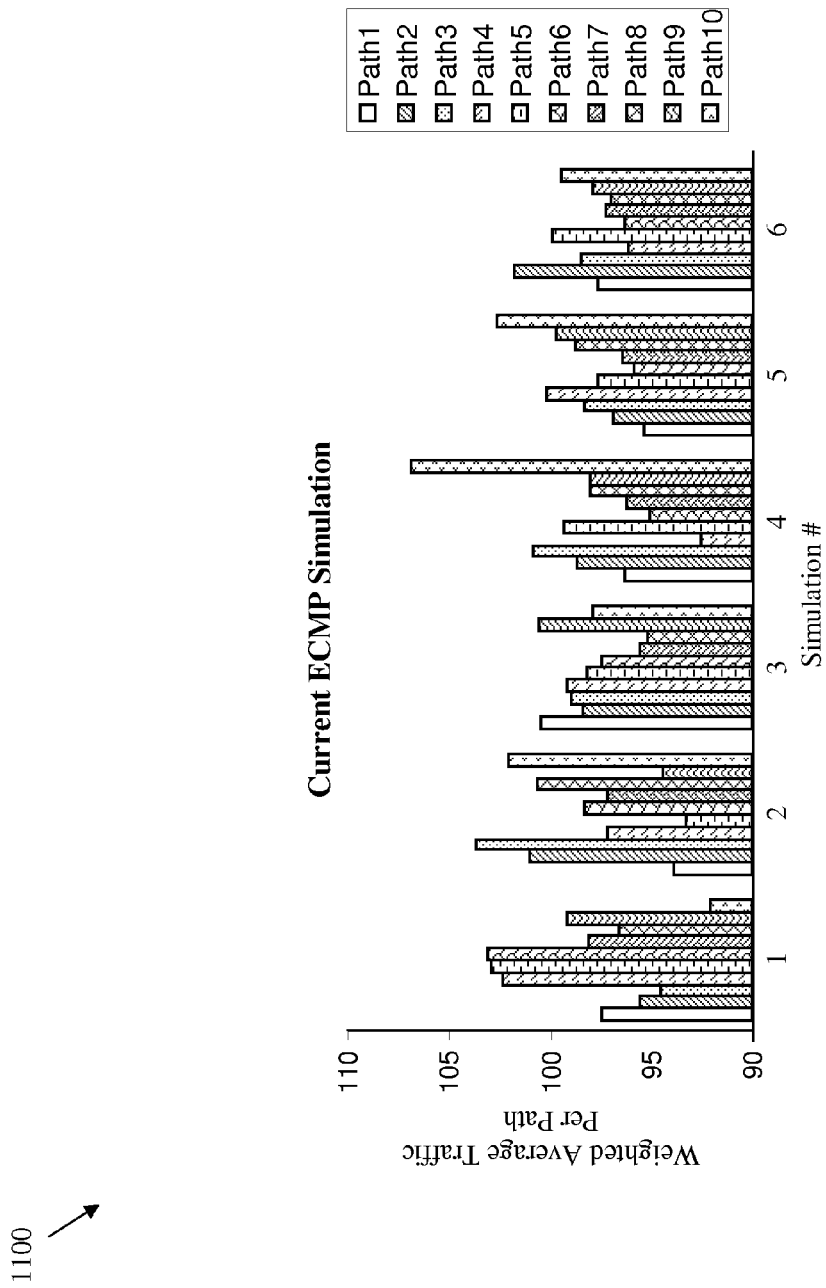
FIG. 11 is a chart showing simulated flow distribution results.

FIG. 11 illustrates an embodiment of another simulated flow distribution 1100 using the conventional ECMP technique. As in the case of the simulated flow distribution 900, a plurality of large flows and small flows that have random rates were generated to simulate typical Internet traffic. The large flows comprise about two percent of the total Internet traffic and occupy about 30 percent of the traffic volume. The small flows comprise about 98 percent of the Internet traffic and occupy about 70 percent of the traffic volume. The generated flows were then distributed over ten ECMP paths using the conventional ECMP technique. The simulation was repeated six times, where each time random flows were generated and then distributed over the ECMP paths.

FIG. 11 shows the distribution of the flows over the ten paths for the six simulations. As shown, the weighted average traffic obtained from distributing the traffic varies substantially over each of the ten paths, which is observed in each of the ten simulations. This uneven or unbalanced traffic distribution may be caused by handling the large flows and the small flows similarly without considering the different rates and volumes between the two. The average volume difference between the ten paths was approximated at about 15 percent using the results obtained in the six simulations. This difference in Internet traffic distribution is larger than that obtained in the simulated flow distribution 900, which may indicate that network utilization and service quality may be reduced as more paths are used in conventional ECMP.

Figure 12:
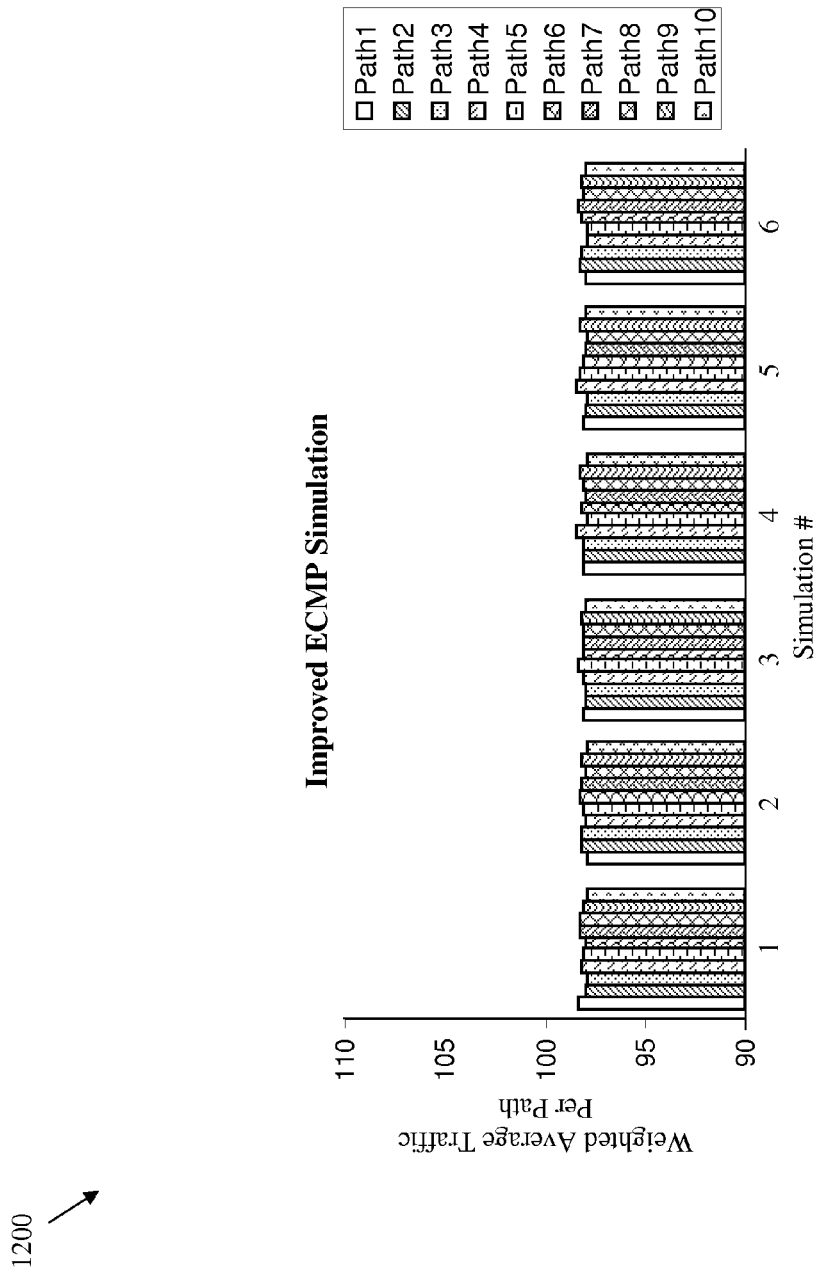
FIG. 12 is a chart showing simulated flow distribution results.

FIG. 12 illustrates an embodiment of another simulated flow distribution 1200, where the same large flows and small flows that were generated in the simulated flow distribution 1100 were used. However, the generated flows were distributed over the ten ECMP paths using the improved ECMP technique that handles the large flows and the small flows separately, e.g. using the methods 600 and 700. The simulation was repeated six times, where each time the same random flows of FIG. 11 were distributed over the same ten paths using the improved ECMP technique.

In comparison to the flow distribution in FIG. 11, FIG. 12 shows a substantial improvement in traffic distribution over the ten paths in each of the six simulations. As shown in FIG. 10, the weighted average traffic obtained is substantially equal over the ten paths, which is observed in each one of the six simulations. The average volume difference between the ten paths was approximated at less than about one percent using the results obtained in the six simulations. This improvement in traffic distribution is about 15 times that of the conventional ECMP technique and is larger than the improvement obtain in the simulated flow distribution 1000 for the case of four paths, which may indicate that using the improved technique becomes more advantageous as more aggregated paths are used.

Figure 13:
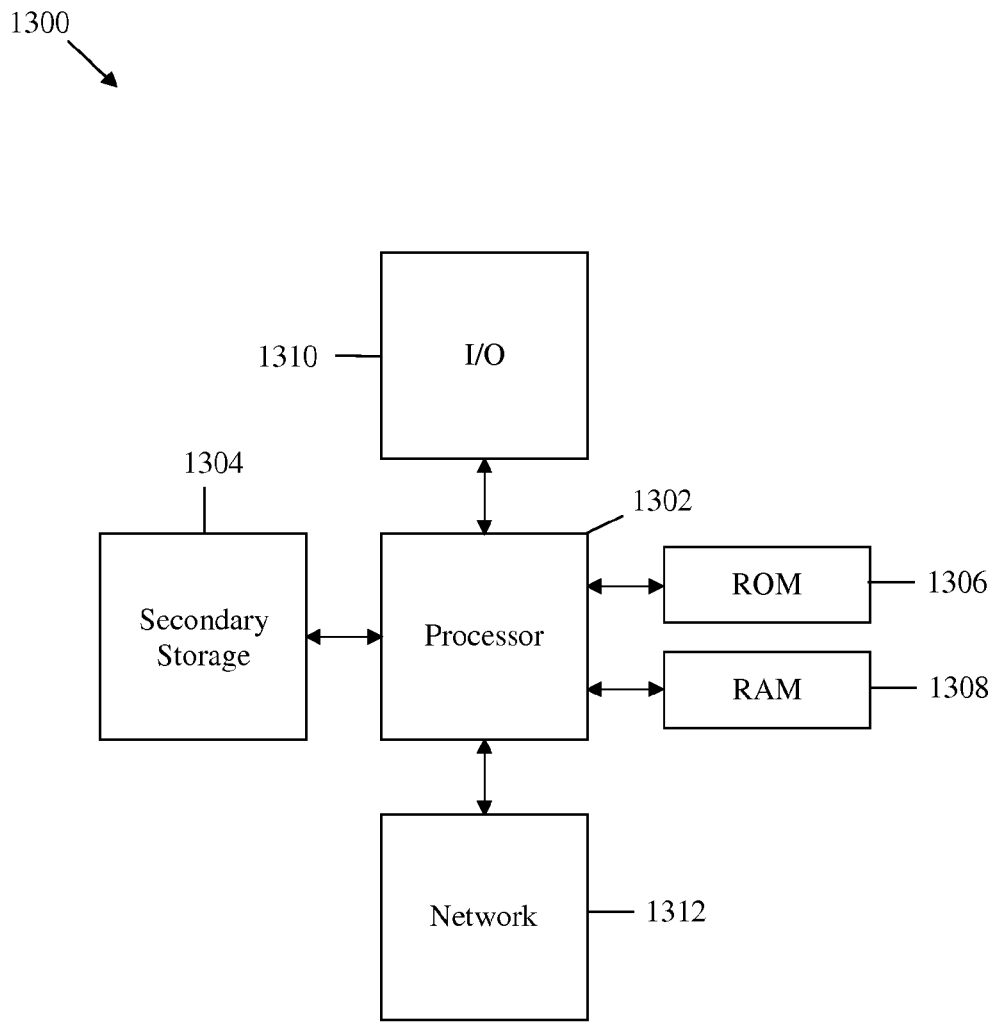
FIG. 13 is a schematic diagram of an embodiment of a general-purpose network component.

The network components described above may be implemented on any general-purpose network component, such as a computer or network component with sufficient processing power, memory resources, and network throughput capability to handle the necessary workload placed upon it. FIG. 13 illustrates a typical, general-purpose network component 1300 suitable for implementing one or more embodiments of the components disclosed herein. The network component 1300 includes a processor 1302 (which may be referred to as a central processor unit or CPU) that is in communication with memory devices including secondary storage 1304, read only memory (ROM) 1306, random access memory (RAM) 1308, input/output (I/O) devices 1310, and network connectivity devices 1312. The processor 1302 may be implemented as one or more CPU chips, or may be part of one or more application specific integrated circuits (ASICs).

The secondary storage 1304 is typically comprised of one or more disk drives or tape drives and is used for non-volatile storage of data and as an over-flow data storage device if RAM 1308 is not large enough to hold all working data. Secondary storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of secondary storage 1304. The RAM 1308 is used to store volatile data and perhaps to store instructions. Access to both ROM 1306 and RAM 1308 is typically faster than to secondary storage 1304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    a small flow forwarding module configured to receive a plurality of first packets that correspond to a plurality of small flows and distribute the first packets over a plurality of paths;
    a large flow forwarding module configured to receive a plurality of second packets that correspond to a plurality of large flows and distribute the second packets over the paths; and
    a packet header checking module in communication with the small flow forwarding module and the large flow forwarding module,
    wherein the packet header checking module is configured to inspect a flow indication in an incoming packet and forward the packet to the small flow forwarding module if the flow indication corresponds to one of the small flows or to the large flow forwarding module if the flow indication corresponds to one of the large flows,
    wherein the large flow forwarding module is further configured to:
        store a large flow table that comprises a list of large flows received at the apparatus;
        determine if there is an entry in the large flow table for a flow for the incoming packet when the flow indication corresponds to one of the large flows;
        adding an entry for the flow to the large flow table if there is no entry for the flow in the large flow table; and
        updating a flow status to current when a flow indication in an incoming packet indicates that a flow for the incoming packet is a large flow and if an entry for the flow is found in the large flow table,
    wherein adding the entry for the flow comprises assigning the flow to a component link and storing the mapping of the flow and the component link into the large flow table, and
    wherein the entry for the flow comprises:
        a flow identifier that indicates the identity of the flow;
        a path identifier that indicates at least one path used to forward the flow; and
        a status identifier that indicates whether the flow is transported over the path identified.

2. The apparatus of claim 1, wherein the large flows represent a plurality of first flows with high flow rates and the plurality of small flows represents a plurality of second flows with low flow rates, and wherein the high flow rates are substantially larger than the low flow rates, and wherein the small flow forwarding module and the large flow forwarding module are positioned between the packet header checking module and the plurality of paths.

3. The apparatus of claim 1, wherein the incoming packet is a pseudowire (PW) packet and the flow indication is a flow label that comprises a traffic class (TC) and a time to live (TTL) field.

4. The apparatus of claim 3, wherein the flow indication corresponds to a small flow if a bit of the TC is set to about zero, wherein the flow indication corresponds to a large flow if the bit is set to about one, and wherein the small flow forwarding module is further configured to distribute the small flows over the paths using hashing distribution.

5. The apparatus of claim 3, wherein the TTL field comprises a value equal to about zero to indicate that a bottom label of the packet is the flow label, and wherein the large flow forwarding module is further configured to distribute the large flows over the path by using the large flow table.

6. The apparatus of claim 1, wherein the incoming packet is a Label Switched Path (LSP) packet and a bottom label of the packet is an entropy label, wherein the large flows are distributed over only a subset of the paths, and wherein at least one path in the subset of the paths include both the large flows and the small flows.

7. The apparatus of claim 1, wherein the incoming packet is an Internet Protocol (IP) version 6 packet that comprises a flow label with a large flow classification in an IP header, and wherein the flow indication corresponds to a large flow if a bit in a traffic class (TC) field is set to about one.

8. The apparatus of claim 1, wherein the incoming packet is an Internet Protocol (IP) version 4 packet that comprises a flow label with a large flow classification in an IP header, and wherein the flow indication corresponds to a large flow if a bit in a type of service field is set to about one.

9. A method comprising:
receiving a packet that corresponds to a flow at an edge node in a network;
determining whether the flow corresponds to a large flow or a small flow;
inserting a large flow indication in the packet to indicate that the flow is the large flow or the small flow;
storing a large flow table that comprises a list of large flows received at an edge node;
determining if there is an entry for the flow in the large flow table;
adding an entry for the flow to the large flow table if there is no entry for the flow in the large flow table;
updating the flow status to current when the flow indication in the packet indicates that the flow is a large flow and if an entry for the flow is found in the large flow table; and
forwarding the packet to an internal node in the network,
wherein adding the entry for the flow comprises assigning the flow to a component link and storing the mapping of the flow and component link into the large flow table, and
wherein the entry for the flow comprises:
a flow identifier that indicates the identity of the flow;
a path identifier that indicates at least one path used to forward the flow; and
a status identifier that indicates whether the flow is transporting over the path identified,
wherein the large flow indicates the flow has a high flow rate, and
wherein the small flow indicates the flow has a low flow rate that is less than the high flow rate.

10. The method of claim 9 further comprising temporarily caching the packets if the flow of the packet is determined to be a large flow and mapping the flow to a path to guarantee forwarding the packet in proper sequence.

11. A network component comprising:
a packet header checking module configured to:
receive a plurality of incoming packets that corresponds to at least one data flow;
detect a flow indication for each incoming packet of the plurality of incoming packets;
forward the incoming packets that correspond to a first data flow with a low flow rate to a small flow forwarding module when the flow indication designates the corresponding data flows as a small flow; and
forward the incoming packets that correspond to a second data flow with a high flow rate to a large flow forwarding module when the flow indication designates the corresponding data flow as a large flow, wherein the high flow rate is greater than the low flow rate,
wherein the small flow forwarding module is coupled to the packet header checking module,
wherein the large flow forwarding module is coupled to the packet header checking module and is configured to:
forward the incoming packets that correspond to the large flows over a plurality of aggregated paths based on a large flow table;
store the large flow table that comprises a list of large flows received by the network component;
determine if there is an entry in the large flow table for a flow for one of the incoming packets that correspond to one of the large flows;
add an entry for the flow to the large flow table if there is no entry for the flow in the large flow table; and
update a flow status to current when a flow indication in an incoming packet indicates that a flow for the incoming packet is a large flow and if an entry for the flow is found in the large flow table,
wherein adding the entry for the flow comprises assigning the flow to a component link and storing the mapping of the flow and the component link into the large flow table, and
wherein the entry for the flow comprises:
a flow identifier that indicates the identity of the flow;
a path identifier that indicates at least one path used to forward the flow; and
a status identifier that indicates whether the flow is transported over the path identified.

12. The network component of claim 11, wherein the incoming packets that correspond to the second data flow that are assigned to the congested path are discarded or redirected to a second path in the aggregated paths, wherein the small flow forwarding module is configured to use a hashing function in distributing the flows to the aggregated paths, and wherein the large flow forwarding module is further configured to forward the incoming packets that correspond to the large flow that is assigned to a path in the aggregated paths that becomes substantially congested to other paths in the aggregated paths that are uncongested by mapping the large flows to the uncongested paths in the large flow table or drop the incoming packets.

13. The network component of claim 11, wherein the incoming packets that correspond to the second data flow that are assigned to the congested path are temporarily cached and subsequently forwarded to another uncongested path to avoid the packet re-ordering.

14. The network component of claim 11, wherein the small flow forwarding module is further configured to forward the incoming packets that correspond to the first data flow to one of the plurality of aggregated paths based on a hashing algorithm.

15. The network component of claim 14, wherein the first forwarding algorithm is an equal cost multi-path (ECMP) algorithm or a Link Aggregation Group (LAG) forwarding algorithm that uses hashing.

16. The network component of claim 14, wherein the large flow forwarding module is further configured to receive a plurality of second packets and forward the plurality of second packets based on a second flow forwarding algorithm, and wherein the second forwarding algorithm uses a flow forwarding table to assign the large flow to one of the aggregated paths.

17. The network component of claim 16, wherein the large flow forwarding module is further configured to:
   check each entry in a flow forwarding table for an active status value, wherein the active status value indicates a large flow corresponding to the entry is transporting data;
   replace the active status value with an aging status value if the active status value is found in any entry, wherein the aging status indicates the large flow corresponding to the entry has not been received for a period of time; and
   remove the entry from the flow forwarding table if the aging status value is found in any entry.

18. The network component of claim 16, wherein the large flow forwarding module is further configured to:
   obtain a flow identifier (ID) in the packet, wherein the flow ID identifies the data flow that corresponds to the packet;
   determine whether there is an entry for the flow ID in the flow forwarding table;
   add to the flow forwarding table a new entry that comprises the flow ID, a path ID that corresponds to one of the aggregated paths assigned to the large flow, and an active status value if the flow ID is not found in the flow forwarding table; and
   update the active status value in the entry for the flow ID if the flow ID is found in the flow forwarding table,
   wherein the active status value indicates the large flow corresponding to the entry is transporting data over one of the aggregated paths indicated by the path ID.

19. The network component of claim 11, wherein the small flow forwarding module and the large flow forwarding module are positioned between the packet header checking module and the plurality of aggregated paths.

* * * * *

UNITED STATES PATENT AND TRADEMARK OFFICE
CERTIFICATE OF CORRECTION

PATENT NO. : 8,619,587 B2
APPLICATION NO. : 12/797010
DATED : December 31, 2013
INVENTOR(S) : Lucy Yong and Yang Peilin It is certified that error appears in the above-identified patent and that said Letters Patent is hereby corrected as shown below:

On Title Page 2, References Cited, under Other Publications, the following cited art should read:

Bradner, S., "Key Words for Use in RFCs to Indicate Requirement Levels," BCP 14, RFC 2119, Mar. 1997.

Kompella, K., et al., "The Use of Entropy Labels in MPLS Forwarding," draft-kompella-mpls-entropy-label-01, Jul. 7, 2008.

Carpenter, B., "Using the IPV6 Flow Label for Equal Cost Multipath Routing in Tunnels," draft-carpenter-flow-ecmp-01, Feb. 18, 2010.

Signed and Sealed this
Twenty-fifth Day of February, 2014

Michelle K. Lee
*Deputy Director of the United States Patent and Trademark Office*